Patented May 26, 1953

2,640,050

UNITED STATES PATENT OFFICE 2,640,050

METHOD OF COPOLYMERIZING VINYLIDENE CHLORIDE AND VINYL CHLORIDE

Walter J. Le Fevre and Harold W. Moll, Midland, Mich., assignors to The Dow Chemical Company, Midland, Mich., a corporation of Delaware No Drawing. Application April 12, 1950, Serial No. 155,554

4 Claims. (Cl. 260—87.7)

This invention relates to a novel method of forming interpolymers of vinylidene chloride and vinyl chloride. It relates in particular to a controlled method of forming such interpolymers whose films or filaments are capable of a predetermined amount of shrinkage when subjected to heat. It relates, as well, to a method of forming such interpolymers whose compositions are extruded with unusual ease.

It is known by X-ray diffraction studies that certain copolymers of vinylidene chloride are crystalline. It is also known that they may be formed into films and filaments wherein the submicroscopic crystallites are aligned parallel to the film surface by extruding the fused copolymer, cooling it to provide a temporarily non-crystalline or supercooled form thereof, and stretching to effect crystallization and orientation. Such oriented crystalline films are known to shrink when heated to a temperature approaching the softening point. The strength and transparency of crystalline vinylidene chloride copolymer films, in the stretched and oriented condition, are much greater than those of unvulcanized rubber, and such films are quite inelastic. Vinylidene chloride copolymer films having such properties, are described by Garnett V. Moore and Carroll R. Irons in copending application Serial No. 788,973 filed on November 29, 1947, now U. S. Patent 2,538,025. That application is concerned especially with a film of a particular copolymer of vinylidene chloride and vinyl chloride. This copolymer is made by polymerizing together in emulsion, suitably with a redox catalyst, a mixture of from 70 to 75 per cent of vinylidene chloride and from 30 to 25 per cent of vinyl chloride, until the polymerization is at least 85 per cent complete, and recovering the copolymer from the resulting latex-like dispersion. The copolymer obtained by said prior method, contains from 70 to 77 per cent vinylidene chloride and complementarily from 30 to 23 per cent vinyl chloride.

The copolymer prepared by the method of the present invention may contain vinylidene chloride and vinyl chloride in the same range of proportions as the copolymer above-described, but the new method is applicable to a broader range of compositions, to be identified below. However, the shrink values of films formed from the copolymer having the same analysis as that given above, when made according to the present invention, exceed by a wide margin those obtained under the same conditions, from films of the copolymer as usually produced. Such improved and unusual shrink values of crystalline vinylidene chloride copolymer films are especially advantageous in certain types of packaging wherein a maximum shrinkage of the film is desired. Maximum film shrinkage and its advantages in the packaging field have already been discussed at great length in previous art. Furthermore, and of greater importance, is the fact that the method of the present invention is capable of producing a copolymer whose films may have a predetermined shrinkage value. Thus, films of low, medium or high shrinkage may be formed as desired from the copolymer of vinylidene chloride-vinyl chloride by the method of our invention.

A desire for improved extrudability of polymeric compositions has been mentioned frequently in the art. Compositions containing the copolymer of vinylidene chloride and vinyl chloride prepared by conventional methods (all monomers being introduced and polymerized in a single step) show rather average extrusion rates. On the other hand, compositions containing the same copolymer made by the method of the present invention, demonstrate unusually high extrusion rates.

It is an object of the present invention to provide a novel method whereby an interpolymer of vinylidene chloride and vinyl chloride may be produced. A related object is to provide such a method which is applicable to the production of vinylidene chloride-vinyl chloride interpolymers of high vinylidene chloride content. A particular object is to provide a method of forming such interpolymers of vinylidene chloride-vinyl chloride whose film or filaments are capable of a predetermined amount of shrinkage when subjected to heat. A further object is to provide a method of forming such interpolymers of vinylidene chloride-vinyl chloride whose films or filaments are capable of an unusually high amount of shrinkage when subjected to heat. A still further object is to provide a method of forming such interpolymers whose compositions may be extruded with unusual ease. Other and related objects will be apparent from the following description and the appended claims.

It has now been found, according to the present invention, that the foregoing and related objects may be attained by a method comprising the prepolymerization of an initial mixture of vinyl chloride with vinylidene chloride in a ratio of from 30 to 65 per cent of the former and complementarily from 70 to 35 per cent by weight of the latter monomer, in a closed system, and only until a particular increase is obtained in the pressure in the system, then adding enough more vinylidene chloride monomer to increase the overall amount thereof to a higher value which lies between 65 and 95 per cent of the total monomer charge, and polymerizing until about 80 to 90 per cent by weight of the total charged monomers is converted to copolymer. The copolymer product is then recovered, and contains from about 70 to 95 per cent vinylidene chloride and complementarily from about 30 to 5 per cent vinyl chloride. Films made from the product containing from 65 to 77 per cent vinylidene chloride are capable of an amount of shrinkage when subjected to a temperature in the range of 85° to 100° C. which is directly proportional to the pressure rise obtained in the first stage of the two-step polymerization, and all of the copolymers show improved extrusion characteristics.

It is important that the polymerization be carried out in two stages. In the first stage, as previously indicated, about 30 to 65 per cent of vinyl chloride and complementarily about 70 to 35 per cent by weight of vinylidene chloride is employed. The amount of water used in the polymerization of the monomers may vary considerably. It is not generally economical to carry out the process in the presence of more than 4 or less than 1 part by weight of water per part of monomer mixture. The process is carried out under well-known polymerization conditions with the usual catalysts, emulsifying or wetting agents and temperatures. The choice of particular ones of the standard conditions is of secondary importance provided, of course, that they are conducive to the promotion of a smooth polymerization reaction.

The emulsion is brought to a temperature sufficient to cause rapid polymerization of the mixture of said monomers, although speed of reaction is not critical to the method of the present invention, the preferred temperature being dependent, in known manner, upon the particular molecular weight desired in the copolymer product. In most instances, the polymerization is conveniently carried out at the temperatures between 10° and 100° C., although temperatures of 20° to 60° C. are usually employed. The polymerization is carried out in a closed container under the vapor pressure of the mixture, and is continued until there is obtained a pressure rise of from 2 to 12 pounds, that has been found to correspond to from 10 to 60 per cent polymerization, and to result in the desired amount of shrinkage in films formed from the copolymeric product separated from the final stage of polymerization. When the desired pressure rise has been attained, the second stage of polymerization is begun by introducing the remaining vinylidene chloride monomer into the partially polymerized copolymer of vinylidene chloride-vinyl chloride and polymerizing to an overall conversion of about 80 to 90 per cent by weight of the totally charged monomers. The amount of vinylidene chloride monomer added in the second stage of polymerization is the amount required so that the total monomer charge is in a ratio of from 65 to 95 per cent vinylidene chloride and complementarily from 35 to 5 per cent by weight of vinyl chloride. The second stage polymerization usually requires a period of 5 to 20 hours for completion at which time the said overall conversion of 80–90 per cent is attained. The copolymeric product is separated thereafter from the final reaction mixture. The resulting copolymer contains from about 70 to 95 per cent vinylidene chloride and complementarily from about 30 to 5 per cent vinyl chloride.

It has been observed that the amount of shrinkage of films formed from the copolymerized product comprising vinylidene chloride-vinyl chloride in said ratio at the end of the second stage of polymerization is proportional to the amount of pressure rise, in a closed system, during the first stage, regardless of the conditions of temperature, polymerization time, and initial proportions of reactants. To illustrate, experience has shown that vinylidene chloride polymerizes more rapidly than vinyl chloride in most mixtures of these interpolymerizable substances. It is known that vinyl chloride is the more volatile of these two substances. When the entire reaction mixture is confined in the reaction vessel throughout polymerization, the vapor pressure increases as the residual monomeric mixture becomes progressively richer in vinyl chloride toward the end of the reaction. When the confined reaction mixture is maintained at a given temperature, the pressure will still continue to increase as the reaction proceeds. For a given polymerization time, there is a corresponding rise in the pressure of the reaction mixture when maintained at a constant temperature in a closed system. It is this corresponding rise in the pressure of the mixture which has been found to be proportional to the amount of shrinkage of films formed from said copolymer produced in the final step of the polymerization. Thus, by carrying out the first stage of polymerization of a mixture of vinylidene chloride and vinyl chloride monomers in the above-defined ratio to produce a particular pressure rise in a closed system, under any given set of conditions of temperature, polymerization time, and initial proportions of reactants, a corresponding amount of shrinkage will be obtained from films formed from the final copolymer product. Moreover, it has been found that the herein-referred-to pressure rise is also proportional to the per cent of polymerization in the first stage of the reaction. To illustrate, first stage polymerizations of mixtures of vinylidene chloride-vinyl chloride in the above-defined ratio, carried out at 30°, 40° and 50° C. until about 20, 35, and 54 per cent of the original monomers had copolymerized, showed corresponding pressure rises of 4, 8, and 12 pounds per square inch at each of the designated temperatures. It is shown in the table below that final film shrinkage is proportional to the pressure rise obtained in the first stage of the process. This indicates that the rise in pressure, in a closed system, as a correlation to the per cent shrinkage of films made from the final copolymer product is independent of the volume and temperature of the reaction mixture as well as the polymerization time. Thus, any amount of shrinkage in the film made from the final copolymer product may be obtained, within limits, from a mixture of vinylidene chloride and vinyl chloride, in the above-defined ratio, when polymerized in the first stage to the desired conversion or correspondingly to the desired rise in the pressure of the closed system, provided the reaction is carried out at any conventional polymerization temperature. In practice, it is much simpler to carry the initial polymerization to a predetermined pressure rise than it is to measure actual conversion to polymer, in order to obtain a corresponding predetermined per cent shrinkage of said film. To illustrate, the following Table I reports the results obtained when various designated monomer mixtures of vinylidene chloride and vinyl chloride are polymerized, in the first stage, to obtain particular pressure rises in a closed system. These, in turn are correlated to the observed shrinkage of films at 100° C., made from the copolymeric product obtained in the second stage polymerization as above-described.

TABLE I

| Initial Charge in Percent by Wt. Vinylidene Chloride - Vinyl Chloride | Pressure rises in lbs./sq. in. before Final Monomer added | Corresponding Degree of Polymerization | Percent Shrinkage of Films at 100° C. |
|---|---|---|---|
| 60–40 | 4 | 20–24 | 39 |
| 50–50 | 4 | 20–24 | 41 |
| 60–40 | 6 | 26–30 | 47 |
| 50–50 | 8 | 35–40 | 53 |
| 60–40 | 8 | 35–40 | 54 |
| 60–40 | 8 | 35–40 | 56 |
| 60–40 | 8 | 35–40 | 57 |
| 60–40 | 12 | 53–60 | 66 |
| 60–40 | 12 | 53–60 | 67 |

The samples tested for shrinkage were strips of flat plate moldings of uniform thickness (about 0.02 inch) of the unplasticized copolymer product as obtained from the second stage of polymerization. The strips were mechanically stretched at room temperature to a point at which resistance to further elongation is encountered. This is the usual and easily reproducible point at which stretching is discontinued. These elongated strips were then measured for length. Next, they were immersed in a water bath at 100° C. for 30 seconds, and again measured for length. The per cent shrinkage of the film was calculated from the difference of the two measured lengths. Pressure rises of less than 4 pounds per square inch are found to be correlated to very low shrinkages of films whereas pressure rises of more than 12 pounds per square inch are correlated to film shrinkages as high as 75 per cent.

It has further been observed that the extrusion rate of a composition containing the copolymerized product at the end of the second stage of polymerization is also proportional to the amount of pressure rise, in a closed system, during the first stage of the two stage polymerization. To illustrate, the following Table II reports the results obtained when various designated monomer mixtures of vinylidene chloride and vinyl chloride are polymerized, in the first stage, to obtain particular pressure rises in a closed system. These, in turn are correlated to observed extrusion rates of compositions prepared from the final copolymeric product. All extrusions were made in the same apparatus and under identical conditions, described below.

TABLE II

| Initial Charge in Percent by Wt. Vinylidene Chloride-Vinyl Chloride | Final Monomer Ratio | Pressure Rises in lbs./sq. in. Before Final Monomer Added | Extrusion Rates of Compositions in lbs./hr. |
|---|---|---|---|
| 50–50 | 85–15 | 4 | 7.6 |
| 50–50 | 85–15 | 8 | 8.2 |
| 67–33 | 85–15 | 12 | 8.5 |
| Blank (one-step) | 85–15 | | 5.6 |

The compositions tested for extrusion rates were standard formulations. Each composition contained 86 per cent by weight of the copolymer product as obtained from the second stage of polymerization, 13 per cent of diisobutyl adipate, and 1 per cent of tetrasodium pyrophosphate. They were extruded at a temperature of about 192°–193° C. through a die containing a single orifice of about 0.125 inch in diameter. The number of kilowatt hours consumed during each extrusion was the same. The observed rates of extrusion, therefore, were obtained under identical conditions of extrusion. It may be noted from the Table II that the extrusion rates of the previously-defined compositions progressively increase with increases in the pressure rise of the confined system during the first stage polymerization. Exceptionally high extrusion rates of said compositions have been obtained with large pressure rises in the confined system during the first stage polymerization. A fairly high extrusion rate of 8.5 pounds per hour may be noted in Table II having resulted from a composition containing a final copolymeric product whose first stage polymerization produced a 12 pound rise in a closed system. In contrast to this, a composition of a copolymer prepared by a conventional technique (all monomers being introduced and polymerized in a single step) having the same overall ratio of monomers (85 per cent by weight of vinylidene chloride to 15 per cent vinyl chloride), was observed to have an extrusion rate of only 5.6 pounds per hour. This composition was formulated in the standard manner described previously and was extruded under the same conditions as the other reported compositions.

The compositions containing the copolymer prepared by the method of the present invention showed an outstanding improvement of 34 per cent in the extrusion rate over that obtained by the composition containing the copolymer prepared by the method of introducing and polymerizing all monomers in one step.

The following examples will illustrate the practice of the invention.

*Example 1*

To a 50 gallon glass lined kettle containing 33 gallons of water, there was added 1970 grams of dihexyl sodium sulphosuccinate (a wetting agent), 4400 grams of a commercial 35 per cent hydrogen peroxide solution, and 211 grams of 7 per cent ferric nitrate solution. This solution was brought to a pH of 2 by addition of 72 per cent nitric acid. After the removal of air from the closed kettle by evacuation, 40 pounds of monomeric vinylidene chloride was introduced. Again, the kettle was evacuated and 40 pounds of vinyl chloride was added. Polymerization began at 22° C. The mixture was emulsified by stirring. The polymerization proceeded at 22° C. for approximately 16 hours, during which time the pressure, in the closed system, had risen 8 pounds per square inch. At this point, 68 pounds additional vinylidene chloride monomer was added. The polymerization was continued at 22° C. for about 6 to 7 hours. During this interval, the pressure rose 11.5 pounds per square inch, then dropped 1 pound per square inch. At this point, the conversion to copolymer, based on total monomers charged to the system, was about 80 to 85 per cent by weight. The latex product was coagulated in a 22 per cent sodium chloride solution at 90° C. The separated polymer was washed and dried. A strip of a flat plate molding (0.02 inch thick), made from the unplasticized copolymer product, had a lengthwise shrinkage of 53 per cent when tested at 100° C. When the copolymer was plasticized and stabilized in the usual manner, it was found to extrude readily and was easily converted into a transparent film by the method described by Stephenson in U. S. 2,452,080. The film was found to have a lengthwise shrinkage of 54 per cent and a crosswise shrinkage of 40 per cent when tested in water at a temperature of 86° C.

In contrast to this, when film samples were formed in the same manner from copolymers prepared by conventional techniques (all monomers being introduced and polymerized in a single step), having the same overall monomer composition (about 73 per cent vinylidene chloride-27 per cent vinyl chloride), they were found to have only a 33 per cent lengthwise shrinkage and a 27 per cent crosswise shrinkage as tested in water at a temperature of 86° C.

Example 2

To a 50 gallon glass lined kettle containing 33 gallons of water, there was added 2000 grams of dihexyl sodium sulphosuccinate, 2000 grams of a commercial 35 per cent hydrogen peroxide solution, and 211 grams of 7 per cent ferric nitrate solution. This solution was brought to a pH of 2 by addition of 72 per cent nitric acid. After the removal of air from the closed kettle by evacuation, 44 pounds of monomeric vinylidene chloride was introduced. Again, the kettle was evacuated and 22 pounds of vinyl chloride was added. Polymerization began at 30° C. The mixture was emulsified by stirring. The polymerization proceeded at 30° C. for approximately 7 hours during which time the pressure in the closed system had risen 12 pounds per square inch. At this point, 81 pounds additional vinylidene chloride monomer was added. Polymerization was continued at 30° C. for about 6 hours. During this interval, the pressure rose 6 pounds per square inch, then dropped 1 pound per square inch. At this point, the conversion to the copolymer, based on total monomers charged to the system, was about 80 to 85 per cent by weight. The latex product was coagulated, separated, washed, and dried as in the previous example. A composition containing 86 per cent by weight of the copolymer product, 13 per cent di-isobutyl adipate, and 1 per cent of tetrasodium pyrophosphate was extruded under the above-defined conditions. An extrusion rate of 8.5 pounds per hour under the previously described standard test conditions was observed to characterize this particular composition.

Thus, by the method of the present invention there is formed a copolymer of vinylidene chloride-vinyl chloride whose films are capable of an unusual amount of shrinkage when subjected to a temperature in the range of 85° to 100° C. Moreover, and of greater importance, the method of the present invention produces a copolymer of vinylidene chloride-vinyl chloride whose films are capable of a predetermined amount of shrinkage when subjected to a temperature in the range of 85° to 100° C. The present method is accurate to within 10 per cent in predetermining the amount of film shrinkage by control of the permitted rise in the vapor pressure during the first stage of polymerization. Furthermore, by the method of the present invention there is formed a copolymer of vinylidene chloride-vinyl chloride whose compositions are extruded with unusual ease.

While the invention has been described as relating to the binary copolymers of vinylidene chloride and vinyl chloride it may be applied as well to the production of ternary or other polynary copolymers in which the vinylidene chloride and vinyl chloride exist in the relative proportions herein described, and together constitute 80 per cent or more of the total polymeric molecule. Other monomers which may be present in minor amounts include acrylonitrile, the esters of acrylic and methacrylic acids, styrene, vinyl acetate, and the like.

The invention has also been described in the examples as involving a first stage, or prepolymerization in which all of the vinyl chloride is present, and a second or final polymerization step following the introduction of more vinylidene chloride monomer. It should be apparent that the monomer introduced after the prepolymerization, while consisting chiefly of vinylidene chloride, may contain small amounts of vinyl chloride, or of the other monomers suggested above.

We claim:

1. The method which comprises copolymerizing, in aqueous emulsion and in a closed vessel, a monomeric mixture at least 80 per cent of which consists of vinylidene chloride and vinyl chloride in proportions between 35 and 70 per cent by weight of vinylidene chloride and complementarily between 65 and 30 per cent of vinyl chloride, only until from 10 to 60 per cent of the mixture of monomers has polymerized, as evidenced by a corresponding increase in pressure in the vessel at the substantially constant reaction temperature by about 2 to 12 pounds per square inch, then adding at one time enough more monomer, consisting of vinylidene chloride to increase the overall ratio of vinylidene chloride to vinyl chloride to a higher value in the range from 65 to 95 per cent vinylidene chloride and complementarily from 35 to 5 per cent vinyl chloride, continuing the polymerization reaction after said vinylidene chloride addition until from 80 to 90 per cent of the total monomeric charge is copolymerized, and thereupon recovering the copolymeric product.

2. The method which comprises copolymerizing, in aqueous emulsion and in a closed vessel, a monomeric mixture of from 35 to 70 per cent by weight of vinylidene chloride and complementarily from 65 to 30 per cent of vinyl chloride, only until from 10 to 60 per cent of the weight of mixed monomers has polymerized as evidenced by a corresponding increase in pressure in the vessel at the substantially constant reaction temperature, by about 2 to 12 pounds per square inch, then adding at one time enough more monomeric vinylidene chloride as the sole added monomer to bring the total ratio of polymerizing materials to a higher value in the range from 65 to 95 per cent vinylidene chloride and 35 to 5 per cent vinyl chloride, continuing the polymerization reaction after said vinylidene chloride addition until from 80 to 90 per cent of the total monomeric charge is copolymerized, and thereupon recovering the copolymeric product.

3. The method which comprises copolymerizing, in aqueous emulsion and in a closed vessel, a monomeric mixture of from 35 to 65 per cent by weight of vinylidene chloride and complementarily from 65 to 35 per cent of vinyl chloride, only until from 10 to 60 per cent of the weight of mixed monomers has polymerized as evidenced by a corresponding increase in pressure in the vessel at the substantially constant reaction temperature, by about 2 to 12 pounds per square inch, then adding at one time enough more monomeric vinylidene chloride as the sole added monomer to bring the total ratio of polymerizing materials to a higher value in the range from 65 to 77 per cent vinylidene chloride and 35 to 23 per cent vinyl chloride, continuing the polymerization reaction after said vinylidene chloride addition until from 80 to 90 per cent of the total monomeric charge is copolymerized, and thereupon recovering the copolymeric product.

4. The method which comprises copolymerizing, in aqueous emulsion and in a closed vessel, a monomeric mixture of from 35 to 70 per cent by weight of vinylidene chloride and complementarily from 65 to 30 per cent of vinyl chloride, only until from 10 to 60 per cent of the weight of mixed monomers has polymerized as evidenced by a corresponding increase in pressure in the vessel at the substantially constant reaction temperature, by about 2 to 12 pounds per square inch, then adding at one time enough more monomeric vinylidene chloride as the sole added monomer to bring the total ratio of polymerizing materials to a higher value in the range from 80 to 95 per cent vinylidene chloride and 20 to 5 per cent vinyl chloride, continuing the polymerization reaction after said vinylidene chloride addition until from 80 to 90 per cent of the total monomeric charge is copolymerized, and thereupon recovering the copolymeric product.

WALTER J. LE FEVRE.
HAROLD W. MOLL.

References Cited in the file of this patent

UNITED STATES PATENTS

| Number | Name | Date |
|---|---|---|
| 2,100,900 | Fikentscher | Nov. 30, 1947 |
| 2,462,422 | Plambeck | Feb. 22, 1949 |
| 2,475,016 | De Nie | July 5, 1949 |
| 2,482,771 | Heerema | Sept. 27, 1949 |
| 2,538,025 | Moore et al. | Jan. 16, 1951 |